United States Patent [19]

Evertz et al.

[11] Patent Number: 5,352,658
[45] Date of Patent: Oct. 4, 1994

[54] PHILLIPS CATALYST AND ITS USE FOR THE PREPARATION OF ETHYLENE HOMOPOLYMERS AND COPOLYMERS

[75] Inventors: Kaspar Evertz, Schifferstadt; Roland Saive, Ludwigshafen; Guido Funk, Worms; Peter Koelle, Ludwigshafen; Rainer Konrad, Goennheim; Hans Gropper, Limburgerhof, all of Fed. Rep. of Germany

[73] Assignee: BASF Aktiengesellschaft, Ludwigshafen, Fed. Rep. of Germany

[21] Appl. No.: 16,277

[22] Filed: Feb. 11, 1993

[30] Foreign Application Priority Data

Feb. 13, 1992 [DE] Fed. Rep. of Germany ....... 4204259

[51] Int. Cl.$^5$ ............................................. B01J 31/00
[52] U.S. Cl. .................................. 502/107; 502/104; 502/117; 502/228
[58] Field of Search .............. 502/104, 107, 117, 228

[56] References Cited

U.S. PATENT DOCUMENTS 3,509,116  4/1970  Cote et al.
4,806,513  2/1989  McDaniel et al. ............... 502/117

Primary Examiner—Anthony McFarlane
Assistant Examiner—E. D. Irzinski
Attorney, Agent, or Firm—Keil & Weinkauf

[57] ABSTRACT

A novel Phillips catalyst for the homopolymerization of ethylene and the copolymerization of ethylene with α-olefins contains, as a catalytically active component, a chromium catalyst supported on a finely divided aluminum silicate gel, modified with a fluoride and activated in an oxidizing atmosphere at elevated temperatures. The finely divided aluminum silicate gel (carrier gel) used here has an alumina content of from 0.5 to 6% by weight, the alumina being concentrated in the surface region of the carrier gel particles. The novel Phillips catalyst has high productivity and gives high molecular weight ethylene homopolymers and copolymers which have excellent low temperature impact strength and do not tend to swell in the blow molding process on emergence from the extruder die.

6 Claims, No Drawings

PHILLIPS CATALYST AND ITS USE FOR THE PREPARATION OF ETHYLENE HOMOPOLYMERS AND COPOLYMERS

The present invention relates to a novel Phillips catalyst for the homopolymerization of ethylene and the copolymerization of ethylene with α-olefins. The novel Phillips catalyst contains, as a catalytically active component, a chromium catalyst supported on a finely divided aluminum silicate gel, modified with a fluoride and activated in an oxidizing atmosphere at elevated temperatures.

Supported chromium catalysts of this type are disclosed in, for example, U.S. Pat. No. 3 509 116 or DE-A-39 38 723 and are used for the preparation of high molecular weight ethylene homopolymers and copolymers. The ethylene homopolymers and copolymers prepared with the aid of these Phillips catalysts exhibit comparatively little swelling when emerging from the extruder die in the blow molding process, but their low temperature impact strength is very unsatisfactory. Furthermore, the productivity of these known Phillips catalysts is unsatisfactory.

It is an object of the present invention to provide a novel Phillips catalyst which does not have the disadvantages of the prior art and which gives, in high yield, ethylene homopolymers and copolymers which have excellent low temperature impact strength and do not tend to swell in the blow molding process.

We have found that this object is achieved effectively and elegantly according to the invention if specific aluminum silicate gels, in which the alumina is concentrated in the surface region of the carrier gel particles, are used as carrier gels.

In view of the prior art, it was not to be expected that the set objectives, in particular improvement of the low temperature impact strength of ethylene homopolymers and copolymers, could be achieved with the aid of this measure.

The present invention accordingly relates to a novel Phillips catalyst for the homopolymerization of ethylene and the copolymerization of ethylene with α-olefins, containing, as a catalytically active component, a chromium catalyst supported on a finely divided aluminum silicate gel, modified with at least one fluoride and activated in an oxidizing atmosphere at elevated temperatures, wherein the aluminum silicate gel (carrier gel) has an alumina content of from 0.5 to 6% by weight, the alumina being concentrated in the surface region of the carrier gel particles.

This novel Phillips catalyst for the homopolymerization of ethylene and copolymerization of ethylene with α-olefins is referred to below as novel Phillips catalyst for the sake of brevity.

That component of the novel Phillips catalyst which is essential according to the invention is the finely divided aluminum silicate gel or carrier gel.

According to the invention, the carrier gel has an alumina content of from 0.5 to 6% by weight. In general, it is not advisable to choose other alumina contents because this has an adverse effect on the catalytic activity of the novel Phillips catalyst. Accordingly, the range from 0.5 to 6% by weight is an optimum range within which the alumina content can be freely chosen and can be adapted to the particular technical requirements of the process. Within this optimum range, that from 1.5 to 4% by weight is noteworthy because the novel Phillips catalysts which have been prepared using aluminum silicate gels having such an aluminum content possess particularly high productivity and give ethylene homopolymers and copolymers having good low temperature impact strength.

According to the invention, the alumina is concentrated in the surface region of the carrier particles.

It is advantageous according to the invention if the alumina is concentrated at the surface of the pores of the carrier gel particles.

The pore volume is advantageously from 0.8 to 1.5 ml/g. Carrier gel particles having a larger or a smaller pore volume can also be used, but the advantages to be achieved according to the invention are then no longer reliably obtained.

It is also advantageous according to the invention if the carrier gel particles have a specific surface area of from 200 to 700 m²/g. If carrier gel particles having a smaller specific surface area are used, the catalytic activity of the relevant Phillips catalysts are frequently unsatisfactory. Unfortunately, Phillips catalysts based on carrier gel particles having a specific surface area of >700 m²/g have a comparatively low abrasion resistance.

In general, the particle size of the carrier gel particles is from 1 to 300 μm, in particular from 10 to 150 μm.

The aluminum silicate gels to be used according to the invention are conventional and known, commercially available materials. Their preparation and properties are described in detail in DE-A-32 44 032 or in the company publication of Grace GmbH, Worms, Grace Silica Gel, December 81/0-2-05.1 Gö.D.

The novel chromium catalyst has a chromium content of from 0.1 to 10, advantageously from 0.5 to 3, in particular from 0.7 to 1.5% by weight. In general, it not advisable to use lower or higher chromium contents because otherwise the advantages to be achieved according to the invention are no longer reliably obtained.

The chromium catalyst to be used according to the invention is modified with at least one fluoride. The amount of the fluoride can be widely varied; according to the invention, however, it is advantageous to use the fluoride in an amount such that the resulting fluoride content of the chromium catalyst is from 0.1 to 5% by weight.

Examples of suitable fluorides to be used according to the invention are ammonium fluoride, ammonium difluoride, ammonium tetrafluoborate, boron trifluoride, ammonium hexafluorophosphate and ammonium hexafluorosilicate, among which ammonium hexafluorosilicate is particularly advantageous and is therefore preferably used.

The chromium catalyst to be used according to the invention can be prepared by various methods. However, it is advisable to load the finely divided aluminum silicate gels described in detail above and to be used according to the invention by known methods, as described in, for example, DE-B-25 40 278 or DE-A-36 40 802, with chromium trioxide or with a chromium compound which can be converted into chromium trioxide under the conditions of the activation described in detail below. In general, loading is effected in a weight ratio of carrier gel particles to chromium of from 100:0.1 to 100:10, in particular from 100:0.5 to 100:3.

Here, the carrier gel particles are advantageously suspended in a solution of chromium trioxide or of a compound which can be converted into chromium trioxide under the conditions of the activation, after which the liquid components of the suspension, for example alcohols and/or ketones and, where relevant, also water, are evaporated with very homogeneous mixing of the suspension. Temperatures of from 20° to 150° C. and pressures of from 10 mbar to 1 mbar are preferably maintained here. It proves to be advantageous to a certain extent if the still unactivated chromium-containing aluminum silicate gel has a certain residual moisture content. However, the volatile components should not amount to more than 20, in particular not more than 10% by weight, based on the still unactivated chromium-containing carrier gel.

Examples of suitable chromium compounds in addition to chromium trioxide and chromium hydroxide, are salts of trivalent chromium with organic and inorganic acids, such as chromium acetate, oxalate, sulfate and nitrate, and chelates of trivalent chromium, such as chromium acetylacetonate. Among these, the compounds which are completely converted into chromium trioxide during the activation are preferred. Chromium-(III) nitrate 9-hydrate and chromium acetylacetonate are very particularly preferably used among these.

The fluorides described above may be applied as early as during the preparation of the still unactivated chromium-containing aluminum silicate gel. According to the invention, however, it is advantageous to apply the fluorides during the activation.

In terms of the method, this activation has no special features but can be carried out by the method described in DE-A-15 20 467. The still unactivated chromium-containing aluminum silicate gel is advantageously heated in an anhydrous gas stream containing oxygen in a concentration of more than 10% by volume to 400°–1100° C., in particular 500°–800° C., for from 10 to 1000, in particular for from 150 to 750, minutes and then cooled to room temperature, resulting in the chromium catalyst to be used according to the invention.

Before being used, the resulting chromium catalyst to be used according to the invention can also be reduced with ethylene and/or α-olefins, carbon monoxide or triethylborane or modified by silylation.

In addition to the chromium catalyst described above to be used according to the invention, the novel Phillips catalyst may also contain organometallic compounds as cocatalysts. Examples of suitable cocatalysts are organolithium, organoboron, organozinc and organoaluminum compounds, as described in, for example, U.S. Pat. Nos. 4 845 176, 4 398 004, 4 444 966, 3 403 142 and EP-A-0 137 934. These cocatalysts can be added in conventional and known amounts, before the actual (co)polymerization, in the form of a solution or of a suspension, to the chromium catalyst to be used according to the invention. However, it is advantageous to meter the cocatalysts directly into the particular polymerization reactor used.

The novel Phillips catalyst is very suitable for the preparation of homopolymers of ethylene and copolymers of ethylene with α-olefins by the Phillips process. Suitable polymerization reactors are the conventional and known loop reactors, autoclaves, gas phase reactors with stirrers and gas-phase fluidized-bed reactors.

Examples of suitable α-olefins which can be copolymerized with ethylene are mono- and diolefins having from 3 to 12 carbon atoms in the molecule. Examples of suitable α-olefins of this type are prop-1-ene, but-1-ene, pent-1-ene, hex-1-ene and oct-1-ene, as well as the conjugated and unconjugated diolefins butadiene, penta-1,3-diene, 2,3-dimethylbutadiene, penta-1,4diene, hexa-1,5-diene and vinylcyclohexene. In general, the comonomers are added to the ethylene in amounts such that the ethylene copolymers are formed from 96 to 99.8% by weight of polymerized ethylene and from 0.2 to 4% by weight of at least one polymerized comonomer.

The novel Phillips catalyst has particular unexpected advantages. For example, it is sensitive to the regulating effect of hydrogen. It is very suitable for the homopolymerization and copolymerization of ethylene by the conventional and known particle-form process in a suspension of a saturated hydrocarbon and ethylene under from 20 to 50, in particular 40, bar and from 90° to 110° C. It has high productivity and gives (co)polymers having excellent morphology, good processability, melt flow indices of from 0.01 to 0.5 g/10 min, high-load melt flow indices of from 1.0 to 20 g/10 min and melt flow ratios of from 50 to 200 and exhibiting only very little swelling on emerging from the extruder die during processing by the blow molding process. The (co)polymers prepared with the aid of the novel Phillips catalyst are therefore particularly suitable for processing by the film blowing and blow molding process.

EXAMPLE AND COMPARATIVE EXPERIMENTS

Example

The preparation of the novel Phillips catalyst and its use for the preparation of an ethylene homopolymer 20 kg of an aluminum silicate gel which contained 3.6% by weight of alumina concentrated in its surface region and had the property profile shown in the Table were dried in a double-cone dryer at 130° C. and 30 mbar for 7 hours. Thereafter, the double-cone dryer was flushed with nitrogen and its contents were cooled to room temperature, after which it was evacuated. 50 l of a solution of 1.35 kg of chromium acetylacetonate in 50 l of methanol were sucked into the evacuated double-cone dryer. After the resulting suspension had been stirred for 30 minutes, the suspending agent was distilled off under atmospheric pressure at 65° C. and the remaining, still unactivated chromium-containing aluminum silicate gel was cooled to room temperature and dried, these steps being carried out while flushing with nitrogen.

19.5 kg of the dry, still unactivated chromium-containing aluminum silicate gel were heated together with 500 g of ammonium hexafluorosilicate (corresponding to 2.5% by weight) in an anhydrous air stream at 600° C. for 10 hours in a fluidized-bed activator and then cooled again. During cooling, the fluidized bed was flushed with nitrogen from 140° C. to eliminate traces of oxygen, which interfere with the polymerization.

The resulting chromium catalyst used according to the invention had a chromium content of $2 \times 10^{-4}$ mol/g, determined by elemental analysis.

It was used directly for the polymerization of ethylene.

This was carried out using a conventional and known loop reactor whose loop had a reaction space of 6 m$^3$. The reaction space was filled with a 45% strength by weight suspension of polyethylene in isobutane, which was pumped by means of a propeller pump at 3000 rpm, so rapidly that turbulent flow prevailed in the reaction space. A temperature of 104.3° was maintained in the reactor. Furthermore, the concentration of the ethylene dissolved in the suspending agent was kept constant at 12% by volume by regulating the amount of suspending agent introduced and discharged (in each case 720 kg/h of isobutane).

In this continuously steady-state operation, 112.5 g/h of catalyst were introduced and 900 kg/h of polymer in granular form were discharged.

The properties of the polyethylene thus obtained are compared in the Table with the properties of the polyethylene of Comparative Experiments A and B. The comparison shows that the low temperature impact strength of the polyethylene obtained in the novel procedure was superior to that of the polyethylenes prepared in the conventional manner. In addition, in contrast to the polyethylenes of Comparative Experiments A and B, the polyethylene of the present Example, obtained in the novel manner, exhibited during blow molding only very little swelling, which did not interfere with the process.

COMPARATIVE EXPERIMENT A

The preparation of a known Phillips catalyst and its use for the preparation of an ethylene homopolymer The Example was repeated, except that the commercially available chromium catalyst 967BW from Grace, Worms, was used instead of the chromium catalyst to be used according to the invention, the polymerization temperature was 106.2° C. and 300 g/h of Phillips catalyst were introduced and 900 kg/h of polyethylene discharged.

The characteristics and the results of Comparative Experiment A are compared in the Table with those of the Example and of Comparative Experiment B. The results confirm that the known Phillips catalyst was clearly inferior to the novel one in terms of the productivity, and the resulting polyethylene was clearly inferior to that obtained in the novel procedure with regard to the low temperature impact strength.

COMPARATIVE EXPERIMENT B

The preparation of a known Phillips catalyst and its use for the preparation of an ethylene homopolymer Comparative Experiment A was repeated, except that, instead of the known Phillips catalyst used there, the Phillips catalyst of Example 1 of DE-A-39 38 723 was used, the polymerization temperature was 104.5° C. and 128.5 g/h of catalyst were introduced and 900 kg/h of polyethylene discharged.

The characteristics and the results of Comparative Experiment B are compared in the Table with those of the Example and of Comparative Experiment A. They too confirm the disadvantageousness of the known Phillips catalyst and of the polyethylene prepared therewith.

TABLE

The preparation of a novel Phillips catalyst (Example) and conventional Phillips catalysts (Comparative Experiments A and B) and their use for the preparation of polyethylene

| Characteristics and experimental results | Example | Comparative Experiment A | Comparative Experiment B |
|---|---|---|---|
| Carrier gel: | | | |
| $Al_2O_3$ content (% by wt.) | 3.6 | 13.0 | — |
| $Al_2O_3$ distribution | in the surface | homogeneous | — |
| Pore volume[a] (ml/g) | 1.0 | 1.1 | 1.0 |
| BET specific surface area[b] ($m^2$/g) | 520 | 475 | 440 |
| Productivity of the catalyst (g/g) | 8000 | 3000 | 7000 |
| Properties of the polyethylene: | | | |
| High-load melt index (HLMI)[c] (g/10 min) | 1.9 | 2.0 | 1.9 |
| Limiting viscosity number $J_g$[d] ($cm^3$/g) | 435 | 465 | 505 |
| Notched impact strength $a_{zk}$ at −30° C.[e] (kJ/$m^2$) | 305 | 210 | 260 |

[a] Determined according to W. B. Innes, Analytical Chemistry 28 (3) (1956), 332
[b] Determined according to S. Brunauer, P. H. Emmet and E. Teller, J. Am. Chem. Soc. 60 (2) (1938), 309 et seq.
[c] According to DIN 53,735
[d] According to DIN 53,733
[e] According to DIN 53,488/1B

We claim:

1. A Phillips catalyst for the homopolymerization of ethylene and the copolymerization of ethylene with α-olefins, which comprises: as a catalytically active component, a chromium catalyst supported on a finely divided aluminum silicate gel, modified with at least one fluoride and activated in an oxidizing atmosphere at elevated temperatures of from about 400° to 1100° C., the aluminum silicate gel (carrier gel) having an alumina content of from 0.5 to 6% by weight, the alumina being concentrated in the surface region of the carrier gel particles.

2. A Phillips catalyst as defined in claim 1, wherein the alumina is concentrated at the surface of the pores of the carrier gel particles.

3. A Phillips catalyst as defined in claim 1, wherein the pore volume of the carrier gel particles is from 0.8 to 1.5 $m^2$/g.

4. A Phillips catalyst as defined in claim 1, wherein the specific surface area of the carrier gel particles is from 200 to 700 $m^2$/g.

5. A Phillips catalyst as defined in claim 1, wherein the particle size of the carrier gel particles is from 1 to 300 μm.

6. A Phillips catalyst as defined in claim 1, wherein the fluoride used is ammonium fluoride, ammonium difluoride, ammonium tetrafluoborate, boron trifluoride, ammonium hexafluorophosphate or ammonium hexafluorosilicate.

* * * * *

UNITED STATES PATENT AND TRADEMARK OFFICE
CERTIFICATE OF CORRECTION

PATENT NO.: 5,352,658

DATED: October 4, 1994

INVENTOR(S): EVERTZ et al.

It is certified that error appears in the above-identified patent and that said Letters Patent is hereby corrected as shown below:

Claim 3, column 6, line 50,
    "m$^2$" should read -- ml --.

Signed and Sealed this

Fifteenth Day of November, 1994

Attest:

BRUCE LEHMAN

*Attesting Officer*      *Commissioner of Patents and Trademarks*